United States Patent [19]
Cramp et al.

[11] 4,443,797
[45] Apr. 17, 1984

[54] RADAR DISPLAY APPARATUS

[75] Inventors: Harry D. Cramp, New Malden; Malcolm R. Blythe, Hove; Philip D. L. Williams, Banstead, all of England

[73] Assignee: Decca Limited, London, England

[21] Appl. No.: 225,529

[22] Filed: Jan. 16, 1981

[30] Foreign Application Priority Data

Jan. 22, 1980 [GB] United Kingdom ................ 8002121
Oct. 17, 1980 [GB] United Kingdom ................ 8033572

[51] Int. Cl.³ .............................................. G01S 7/04
[52] U.S. Cl. .............................. 343/5 SC; 343/5 CD; 343/5 CE; 343/17
[58] Field of Search .............. 343/5 CD, 5 VQ, 5 SC, 343/5 DP, 17, 5 CE

[56] References Cited

U.S. PATENT DOCUMENTS

| 3,617,997 | 11/1971 | Maass et al. | 343/5 CD X |
|---|---|---|---|
| 4,065,770 | 12/1977 | Berry | 343/5 SC |
| 4,071,843 | 1/1978 | Marien | 343/5 CD |
| 4,099,179 | 7/1978 | Hofstein | 343/5 SC |
| 4,128,834 | 12/1978 | Katagi | |
| 4,165,506 | 8/1979 | Brands et al. | 343/5 SC X |
| 4,383,258 | 5/1983 | Morin | 343/5 SC |

FOREIGN PATENT DOCUMENTS 38102A 10/1981 European Pat. Off. .
1384686 2/1975 United Kingdom .
1388233 3/1975 United Kingdom .
1443885 7/1976 United Kingdom .
1498413 1/1978 United Kingdom ............ 343/5 VQ
1507220 4/1978 United Kingdom .
2003355 3/1979 United Kingdom .
1571540 7/1980 United Kingdom ............ 343/5 VQ
2037117 7/1980 United Kingdom .
2047040A 11/1980 United Kingdom .

Primary Examiner—Maynard R. Wilbur
Assistant Examiner—Robert C. Burk
Attorney, Agent, or Firm—Cushman, Darby & Cushman

[57] ABSTRACT

Radar display apparatus employs digital techniques to convert range/azimuth scan to T.V. scan. A digital store contains data defining the brightness of levels for the picture cells of a T.V. display. The store is continuously updated in accordance with received video from a digitiser. The correct cell in the store for updating is identified by converting polar coordinates to Cartesian coordinates in a Sin $\theta$, Cos $\theta$ generator and integrators. The contents of the store for the addressed picture cell is modified by a control unit in accordance with the digitised video return so as to represent the degree of positive correlation of returns in that cell on successive azimuth scans of the radar. Thus the brightness or color of the cell on the T.V. display represents this degree of correlation.

21 Claims, 5 Drawing Figures

RADAR DISPLAY APPARATUS

BACKGROUND OF THE INVENTION

The present invention is concerned with radar display apparatus particularly for an azimuth scanning radar. It is already an established technique in radar apparatus to digitise the received video return signals. Such digitised video can then be processed using digital techniques which can have many advantages. It is also well known to employ scan converters for converting the normal rotating PPI radar display to a T.V. type display. Such T.V. displays can be very much brighter than the rotating PPI displays which have to use a long persistence phosphor to provide a full radar display picture. If the radar video is digitised, digital techniques can be used for this scan conversion and one arrangement for digital scan conversion is described in British Patent Specification No. 1498413.

There have also been various published discussions of the desirability in marine radar of de-correlating sea clutter returns in successive azimuth scans of the radar apparatus, see for example the article "Further Observations on the Detection of Small Targets in Sea Clutter" by Croney Woroncow and Gladman in "The Radio and Electronic Engineer", volume 45, No. 3, March 1975, pages 105 to 115. Indeed, the advantages of integrating slow-moving or stationary target returns over successive azimuth scans are well established. However, hitherto, azimuth scan to scan integration has been achieved using photographic techniques, i.e. multiple exposure on successive aximuth scans of a PPI display. The advantages of azimuth scan to azimuth scan correllation in discriminating small targets in sea clutter, are also discussed in the article "The Impact of New Display Technology on the Detection of Small Targets at Sea by Radar", by Williams, in "Electronic Circuits and Systems", November 1979, Volume 3, No. 6, pages 241 to 246. This article suggests, in the first column of page 244, the use of digital techniques for correllating returns from successive azimuth or aerial scans. However, no detail is given in this article of how these objectives are to be achieved.

SUMMARY OF THE INVENTION

According to the present invention, radar display apparatus for an azimuth scanning radar comprises a radar video digitiser, electronic digital storage means having a storage location for each of a predetermined number of cells forming between them a radar display picture, store control means arranged to modify data in said storage means so that the digital data in each said cell location is representative of the degree of positive correlation of digital video returns occurring in the respective cell on successive radar azimuth scans, visual display means and display control means arranged to read said digital data from the storage means and to control said display means to provide a subsstantially real time radar display picture composed of said cells with the brightness or color of each cell being representative of said degree of positive correlation. In this way the full advantages of correlation between successive azimuth scans is achieved using digital hardware techniques, and the resulting visual display provides a picture in which the brightness or color of responses is dependent on the level of correlation of the received signals in successive azimuth scans.

As is already well known and discussed in the abovementioned articles, the technique of correlation between successive azimuth scans is best applicable to relatively slow moving targets and preferably employs a relatively high aerial scanning rate so that a target remains in the same cell of the visual display for a number of successive aerial scans so that then positive correlation of the target returns can be achieved.

Preferably, said storage means has locations for cells in a rectangular matrix for a T.V. type display, and said store control means converts the range/azimuth angle (r, $\theta$) co-ordinates of digitised radar video into Cartesian co-ordinates for identifying the store locations of the equivalent cells. In this way the data contained in the storage means is available in the rectangular matrix in a form suitable for reading out for display on a T.V. display monitor. Thus, this form of the apparatus simultaneously scan converts the received radar video for display on a T.V. monitor providing the advantages of a bright continuous display.

It can be appreciated that the spacial sampling density of the digitised video in (r, $\theta$) co-ordinates is greater at short ranges than at long ranges, whereas the sampling density provided by the rectangular matrix of cell locations in the storage means is substantially constant over the entire radar picture. Further, the rate at which the online digitised video is sampled for converting the (r, $\theta$) co-ordinates to Cartesian co-ordinates may cause two or more (r, $\theta$) samples to fall in the same Cartesian co-ordinate cell. If the store control means is arranged to modify data in the designated cell location of the storage means on each conversion of an (r, $\theta$) sample to Cartesian co-ordinates the same cell location would sometimes be modified more than once in the same azimuth scan. This would produce a false degree of correlation in those cells. Accordingly, where the (r, $\theta$) co-ordinates are expressed digitally with unit range increments defining a range scan at each of successive azimuth increments, said store control means preferably includes cell correlation means arranged to identify when successive range increments of a range scan in (r, $\theta$) co-ordinates convert to the same Cartesian co-ordinates and then to effect said modification of data in the respective cell location of the storage means only once in the range scan. In a convenient arrangement, said cell correlation means includes means for storing at least the two lowest order bits of the cell location identifying Cartesian co-ordinates following each said conversion from (r, $\theta$) co-ordinates, means for comparing said stored bits with the corresponding bits of the subsequent conversion and means for inhibiting said modification of data if said stored bits and said corresponding subsequent bits are the same. Thus, the store control means is permitted to perform a modification of data in the designated cell location only if the latest conversion from (r, $\theta$) co-ordinates has identified a new cell location.

Further, especially at short ranges, the (r, $\theta$) co-ordinates of range samples at similar ranges in successive range scans of the radar may also convert to the same Cartesian co-ordinates and thereby identify the same cell location. Thus, preferably, the cell correlation means is further arranged to identify when (r, $\theta$) co-ordinates in successive range scans convert to the same Cartesian co-ordinates and then to effect said modification of data in the respective cell location of the storage means only on one of said range scans. To achieve this, conveniently said cell correlation means further comprises means for storing during each range scan at least the two lowest order bits of the cell location identifying Cartesian co-ordinates following said conversions of all the unit range increments, means for comparing the corresponding bits of the conversions of each range increment of the subsequent range scan with the stored bits for the corresponding and immediately adjacent range increments, and means for inhibiting said modification of data if said corresponding bits of said subsequent range scan are the same as said stored bits of any of said corresponding or immediately adjacent increments. Thus, the Cartesian co-ordinates of each conversion is compared with the conversion in the previous range scan not only at the same range but also at the range increments on either side thereof. By these techniques, the modification of data in any one cell location of the storage means more than once during a complete azimuth scan is avoided.

As mentioned previously, in order for returns from moving targets to correlate in successive azimuth scans it is usually desirable to ensure that the returns extend spacially on the display means over a plurality of adjacent cells. Thus, it may be preferable to employ the present apparatus with a radar having a relatively wide beam width, say 2° wide or more and, further, it may be desirable to stretch the received video pulses to ensure they extend sufficiently in range.

Preferably, the radar video digitiser provides a one-bit digital video signal with a logic "0" indicating no video and logic "1" indicating a positive video return. Then said electronic digital storage means may have three bits of storage for each said cell location, and said store control means may be arranged to write into said locations digital numbers representing up to eight levels of said positive correlation. To achieve this, said store control means may be arranged so as, on each modification of data in a cell location, to read the digital number already stored in the location, to increment the number by one if the digital video indicates a positive video return and to write the thus-incremented number back into the location. Thus, the number in the location for each cell corresponds to the number of times in the immediately preceding azimuth scans that there has been a positive video return in that cell. Normally, the digital number is progressively decremented and written back into the location in the absence of positive video returns.

In a preferred arrangement, where the cell brightness is representative of the degree of positive correlation, decrementing of the number in the location below a predetermined value is temporarily inhibited so as to generate a synthetic afterglow effect on the display means. It will be appreciated that, with relatively slow moving targets, substantially no afterglow tails would appear on the display if the numbers in the various cell locations were modified in successive azimuth scans down to the minimum level once the target return had moved out of the cell. However, by temorarily inhibiting decrementing of the number in the location below a predetermined value, afterglow tails can be produced on the display. Normally, the predetermined value is selected so that the brightness level of the afterglow tails on the display is at a conveniently lower level than the brightness of fully correlated target returns. Conveniently, the store control means may have a comparison device arranged to produce a write inhibit signal, when the number read from the cell location being modified is said predetermined value and the digital video is logic 0, so as to inhibit writing of a decremented number in the location, a counter arranged to be incremented in response to each said write inhibit signal, and a latch device responsive to the counter reaching a preset maximum count to prevent inhibiting of the writing of the decremented number in the cell location being modified on the next occasion the number read is said predetermined value and the video is logic 0. By varying the setting of the maximum count in the counter, the persistence of the afterglow tails on the display can be adjusted. Further, because only a single counter is used for all afterglow tails on the display, the length of the tails is automatically dependent on the number of moving targets on the display.

The store control means may have a range dependent afterglow control means arranged to prevent said inhibiting of the writing of a decremented number when in response to video logic 0 returns at below a predetermined range. In this way the display may be provided with in effect "swept afterglow", that is to say afterglow may be provided on targets only beyond a certain range.

Further, if the radar display apparatus is used in combination with radar apparatus having a video processor which provides a clutter level signal responsive to the level of clutter noise in the received video, the store control means may have clutter level dependent afterglow control means arranged to prevent said inhibiting of the writing of a decremented number when the clutter level signal indicates the received clutter is above a predetermined clutter threshold level. In this way afterglow can be inhibited at locations on the display where there is relatively high received clutter.

Although the above arrangements for generating and controlling synthetic afterglow are primarily concerned with controlling the brightness of cells, in modified arrangements the visual display means and the display control means may be arranged so that the color of each cell, instead of the brightness, is representative of said degree of positive correlation, said synthetic "afterglow" effect being then a color effect rather than a brightness effect.

Preferably said store control means is arranged to set aside one of said levels represented by digital numbers written into the cell locations, for identifying a marker cell on the visual display means, and a marker generator is provided to designate predetermined cells as marker cells and to superimpose the number representing said one level on the data being written by the store control means into said marker cells, said level which is set aside being selected to have a digital number which is below said predetermined value at which decrementing is temporarily inhibited to generate afterglow. In this way markers can be written up on the display means by suitably controlling the marker generator. It can be seen that these markers, being written into the storage means at appropriate cell locations are automatically correctly spacially positioned relative to the radar display irrespective of any distortion that there may be in the display means itself. Further, because the set aside level identifying a marker cell is below the value at which cells are maintained to provide afterglow, the markers can be promptly or immediately cancelled from the display when desired.

Said store control means may be arranged to generate digital numbers for writing into said cell locations representing at least four said levels of positive correlation, distinct from the set aside marker level, the four levels being a top level for highly correlated video returns for generating high brightness cells on the display means, an intermediate level for less highly correlated returns for generating less bright cells, a low level for relatively uncorrelated returns for generating low brightness cells, and a bottom level for no returns for generating substantially dark cells, said intermediate level corresponding to the predetermined value at which decrementing is temporarily inhibited to generate afterglow. It can be seen, therefore, that a minimum of five levels, including the marker level, are required.

If is preferable for said display control means to be arranged to produce on the display means a non-linear response between brightness and the levels represented by the digital numbers read from said cell locations so that the higher level or levels representing highly correlated video returns are substantially brighter on the display means than the intermediate and lower levels.

DETAILED DESCRIPTION OF THE DRAWINGS

Figure 1:
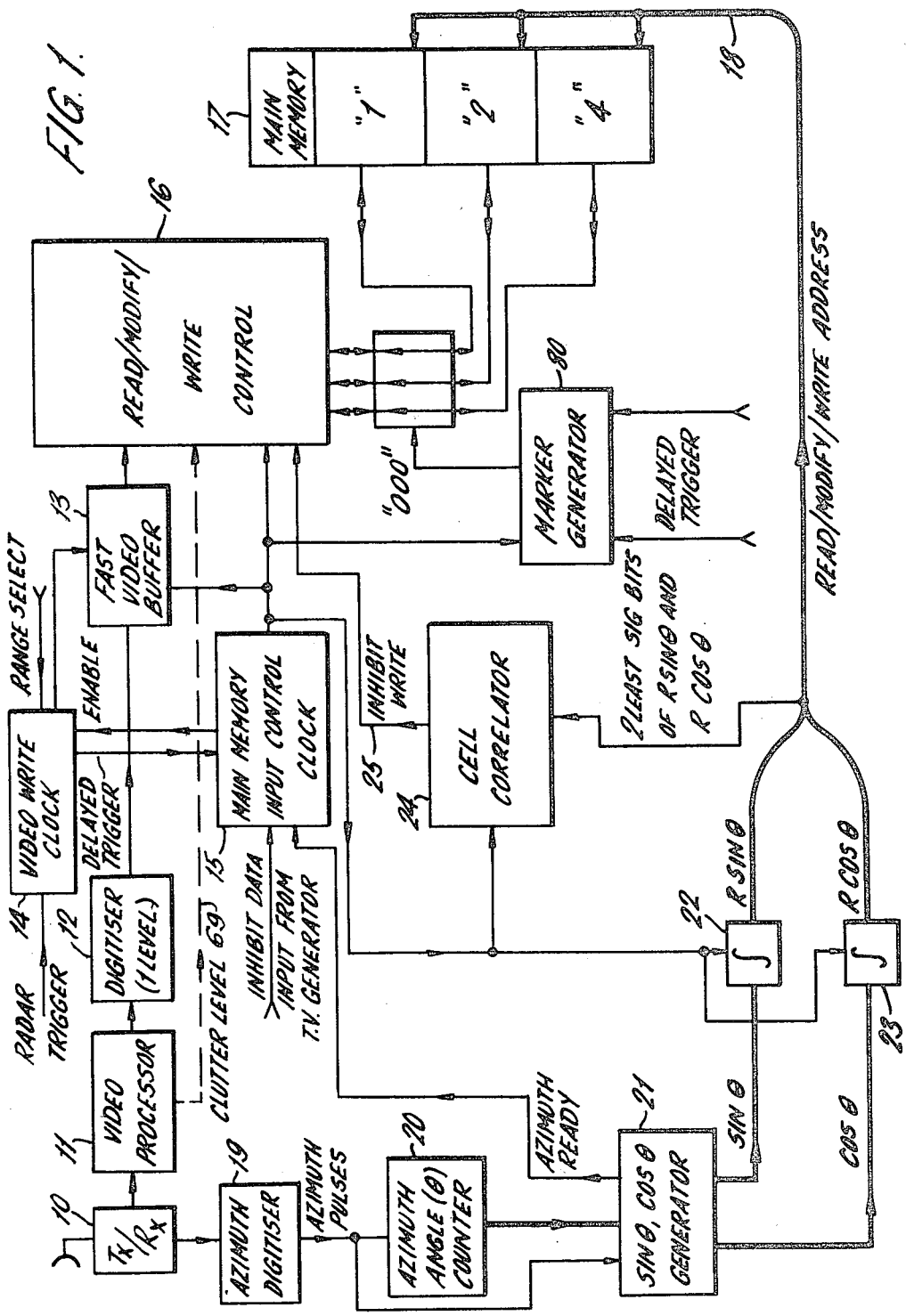
FIGS. 1 and 2 are block schematic diagrams together illustrating a complete radar apparatus incorporating display apparatus embodying an example of the present invention.

Referring to FIG. 1, an azimuth scanning radar transmitter and receiver 10 provides analog video to a video processor 11. The radar transmitter and receiver 10 may be a standard azimuth scanning radar but preferably has a relatively wide band width, 2° or more, and a relatively fast azimuth scanning speed, say, 30 rpm or more. The beam width and scanning speed desirable in the present apparatus are dependent on the maximum speed of moving targets for which it is desired to achieve correlation in successive azimuth scans. The present apparatus may be employed with sector scanning aerials as well as aerials rotating through 360°. Preferably the radar receiver is a logarithmic receiver. The video processor 11 can employ known video processing techniques for minimising Rayleigh-type rain and sea clutter. A preferred arrangement for the video processor 11 is that disclosed in our British Pat. No. 1571540 which includes a video threshold controller which is automatically adaptive to the clutter level in the received video. The video processor 11 may also include a pulse stretcher to lengthen in time the fully processed video pulses to ensure they extend over at least one picture cell of the final display format. The amount of pulse stretching is also dependent on the speed of targets to be correlated in the apparatus, and may also be dependent on the range of the targets.

The processed analog video is fed to a one-level digitiser 12 which essentially comprises a threshold level detector arranged to produce a logic "1" output whenever the analog input video signal exceeds the threshold and to produce a logic "0" when the input video is below the threshold. Thus, the digitised video from the digitiser 12 is a stream of logic 1's and 0's representing video returns in real time. The digital video in a single range scan, i.e. between two consecutive radar triggers, is clocked in real time into a fast video buffer 13. The clock signal for writing the digital video into the buffer 13 is provided by a video write clock 14 which is initiated by the radar trigger and an enable signal from a main memory input control clock 15. The rate of the clock pulses from the video write clock 14 determines the rate of sampling of the digital video and hence the sizes (in range) of the samples. The fast video buffer 13 is provided with storage locations for 512 bits. However, for normal operation of the radar display apparatus with the display centred on the screen, only 256 bit locations of the buffer 13 are required. Thus, following a radar trigger pulse, the video write clock 14 generates clock pulses at a predetermined rate to sample the digitised video from the digitiser 12. After 256 clock pulses, loading into the fast video buffer is terminated and the video write clock 14 generates a delayed trigger signal which is supplied to the main memory input control clock 15. The main memory clock 15 controls the reading of data from the fast video buffer 13 at a relatively slower rate for input to the main memory as will be described later. It will be sufficient for the moment to understand that the digital video is read from the fast video buffer 13 at a constant rate which is normally slower than the rate of clocking into the buffer 13.

It can be appreciated that the range of video signals stored in the buffer 13 in the 256 locations is dependent on the clock rate from the clock 14, the faster the clock rate, the shorter the range of video clocked into the buffer 13. In this way, the displayed range is controlled by selecting the rate of clock pulses produced by the video write clock 14. The operation of the fast video buffer 13 is very similar to that described in detail in British Patent Specification No. 1498413.

The stored video is clocked out of the fast video buffer 13 by clock pulses generated by the main memory input clock 15 which starts in response to the delayed trigger from the video write clock 14. The digital video read from the buffer 13 is supplied to a read/modify/write control unit 16 which controls and modifies the data in a main memory 17. The main memory 17 has three planes each comprising a matrix 512 bits square. The bits of the matrix of any one of the three planes corresponds to a picture cell on the display screen of the apparatus as will become apparent. Corresponding cell locations in the three planes of the main memory 17 are addressed simultaneously by address data on an address bus 18. The read/modify/write control unit 16 operates in response to a clock pulse from the main memory input control clock 15 to read the three bits of data at the addressed locations in the three planes of the main memory 17. The read/modify/write control unit 16 then modifies these three bits of data read from the memory 17 in accordance with the state of the received video data bit from the buffer 13. The modified three bits are then re-stored in the main memory at the same locations.

The three planes of the memory 17 can be considered to provide between them a single rectangular matrix of store locations each of three bits. Therefore, if the three bits of data stored in the corresponding locations of the three planes are regarded as a binary number, one of the memory planes can be regarded as storing bits of significance "1", a second of the planes can be ragarded as storing bits of significance "2" and the third plane bits of significance "4". The read/modify/write control unit 16 operates, when the digital video from the buffer 13 is a logic 1, to add one to the binary number represented by the three bits of data from the main memory 17, assuming these bits are not already "1 1 1". In one operating mode, the read/modify/write control unit 16 further, when the digital video from the buffer 13 is a logic 0, deducts one from the binary number before this is written back into the memory 17.

The address of the bits in the three planes of the main memory 17 is arranged to be the address of the cell location in the matrices of the memory 17 which has Cartesian co-ordinates corresponding to the polar co-ordinates of the video data bit being read from the buffer 13. To achieve this, the azimuth angle of the aerial of the radar transmitter and receiver 10 is digitised by an azimuth digitiser 19 which produces azimuth pulses corresponding to unit changes in azimuth angle of the radar aerial. The azimuth pulses are counted in a counter 20 so that the count in the counter at any time represents the instantaneous azimuth angle of the aerial. The count is supplied by the counter 20 to a Sine/Cosine generator 21 which calculates, at each azimuth pulse, binary numbers corresponding to the Sine and Cosine of the azimuth angle ($\theta$). These are twelve-bit binary numbers and they are supplied to a pair of accumulators 22 and 23. When a fresh set of binary words for the Sine and Cosine of the azimuth angle following an azimuth pulse are ready, the generator 21 sends an azimuth ready signal to the main memory input control clock 15 which enables it to initiate clock pulses following receipt of the delayed trigger as described previously. The clock pulses from the main memory input control clock 15 are also supplied to the two accumulators 22 and 23. Each accumulator contains a nine bit presettable up/down counter and also adding logic circuitry capable of handling twelve bits. On receipt by the accumulators 22 and 23 of a clock pulse from the main memory input control clock 15, values Sin $\theta$ and Cos $\theta$ are added into the respective counters, retaining only the nine most significant bits. With suitable scaling of the values of Sin $\theta$ and Cos $\theta$ it can be seen that this process progressively identifes in the nine bit counters the values of R Sin $\theta$ and R Cos $\theta$ to consecutive range increments of the digital video being read out on the buffer 13 (R is the range). Thus, the numbers in the nine bit counters in the accumulators 22 and 23 represent the Cartesian co-ordinates of the corresponding cell on the display screen for the video data being read out at the buffer 13. These Cartesian co-ordinates are fed, via the address bus 18, to the main memory 17 to address the respective locations in the three memory planes of the memory 17 for the read/modify/write sequence of the control unit 16.

Off-centering of the resulting video display can be achieved by presetting the nine bit counters in the accumulators 22 and 23 with a desired number representative of the Cartesian co-ordinates of the off-set origin of the display. It can now be seen that if the display is not off-set so that the origin has Cartesian co-ordinates corresponding to X=256 and Y=256 in a display matrix 512 cells square, only 256 elements of video are required to be stored in the video buffer 13 to provide a display extending from the origin to the edges of the screen. However, if the origin is off-centred to one edge of the screen, then a maximum of 512 elements of video are required in the buffer 13 to fill the screen right across to the opposite edge.

As has been explained previously, it is possible for successive range increments in polar co-ordinates as defined by successive pulses from the main memory input control clock 15, to produce in the nine-bit counters of the accumulators 22 and 23 identical numbers, identifying the same cell location in the main memory 17. It is important to prevent the read/modify/write control unit 16 from re-accessing this same cell location and performing a further read/modify/write operation on the location in response to the received video, as this would cause the number stored in the three bits of the cell location of the memory 17 to represent a false degree of correlation for that cell. Also, it is possible for conversions at substantially corresponding ranges in successive azimuth scans, as defined by successive azimuth pulses, also to identify the same cell in this manner. Accordingly, in FIG. 1 there is provided a cell correlator unit 24 to which is fed the two least significant bits of the values of R Sin $\theta$ and R Cos $\theta$ as supplied to the address bus 18. These two least significant bits can distinguish between up to four adjacent picture cells along either the X or the Y axis and in the present arrangement the maximum spacing of range samples at the corresponding range in successive azimuth scans is less than four adjacent picture cells. Therefore, the provision of only the two least significant bits of R Sin $\theta$ and R Cos $\theta$ is sufficient to ensure positive identification of any occasions when the same picture cell is identified twice either in the same range scan or in two consecutive range scans. The operation of the cell correlator unit 24 will be described in greater detail later herein. However, it operates to produce an inhibit write signal on a line 25 on each occasion when it identifies that same picture cell has been identified in R Sin $\theta$ and R Cos $\theta$ (X,Y) co-ordinates either on successive range increments of the same range scan (i.e. successive pulses from the clock 15), or at corresponding ranges in successive range scans. The inhibit write signal inhibits the read/modify/write control unit 16 from writing the modified number back into the main memory 17 so that the original number at the respective cell location of the memory 17 is left unmodified.

Figure 2:
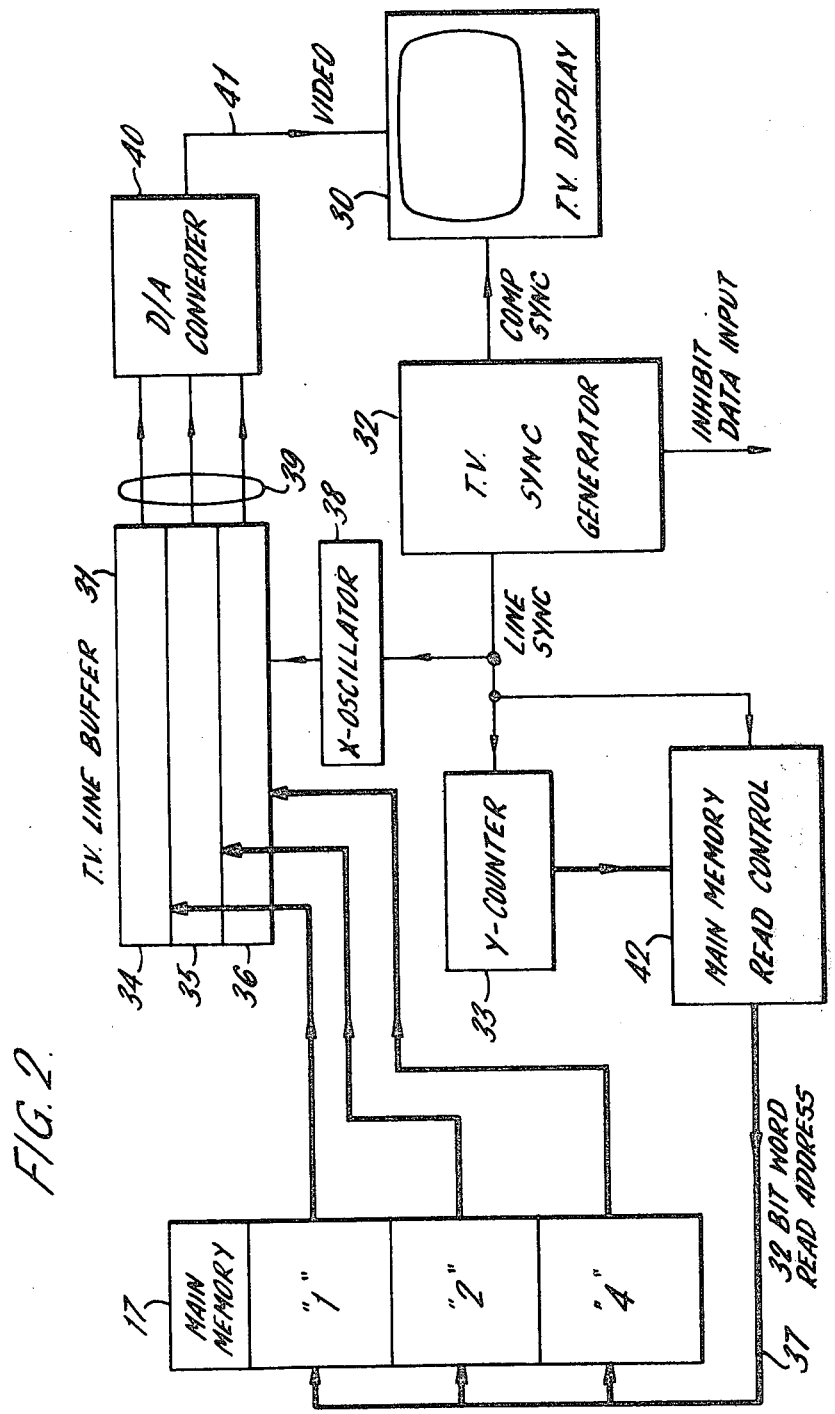

FIG. 2 is a block schematic diagram of the arrangement for reading the data from the main memory 17 for display on a T.V. display 30. The 512-bit square rectangular matrix of cells for which data is stored in the main memory 17 are displayed on the T.V. display 30 as 512 lines each of 512 elements. The brightness of each element in a line is controlled in accordance with the three-bit digital number stored in the corresponding cell location of the main memory 17 and is thus dependent on the degree of positive correlation of digital video returns for that cell in successive azimuth scans of the radar aerial. At normal T.V. scanning rates, the presentation of 512 elements per line requires a band width of 13.2 mHz. In order to enable the three-bit digital numbers stored in the main memory 17 to be available for conversion to T.V. video at this band width, a T.V. line buffer store 31 is employed. A T.V. sync generator 32 produces line sync pulses which are supplied to a Y-counter 33 which in effect counts the sync pulses to generate a number corresponding to the next line to be drawn on the T.V. display. The number in the Y-counter and the line sync pulses are supplied to a main memory read control unit 42 which controls reading of data from the main memory 17 into the T.V. line buffer store 31. The line buffer store 31 comprises three separate shift registers 34, 35 and 36 each associated with one of the planes of the main memory 17. The data for the designated next line of the T.V. display is read from the main memory 17 in 32-bit words so that data is supplied to the T.V. line buffer 32-bits in parallel at a time. Sixteen such 32-bit words are sufficient to fill all 512 bits of each line buffer 31. The transfers from the three memory planes to the corresponding three registers 34, 35 and 36 take place simultaneously. The main memory read control 34 provides on an address bus 37 the addresses of the sixteen 32-bit words to be read to provide a complete line of data. By reading the data from the main memory 17 into the line buffer 31 in 32-bit words, the buffer 31 can be filled with all the data necessary for the next line on the T.V. display during the line fly-back time of the display, i.e. after the previous line ends and before the subsequent line begins. Even so, however, since only sixteen word reading operations are required to fill the buffer 31, these operations can be completed in the available time, typically 12 $\mu$s, using available memory types for the main memory 17. The registers 34, 35 and 36 are shift registers and once the buffer 31 is full and the T.V. display 30 begins to draw the next line an X oscillator 38 clocks the registers of the buffer 31 simultaneously to produce three bit streams on lines 39 all at the same rate which corresponds to the scan speed of the line on the T.V. display. The bit streams on the line 39 are fed to a digital to analog converter 40. The converter 40 converts the three-bit digital numbers represented by the three bit streams in parallel into multi-level video signals which are supplied on a line 41 to the T.V. display to modulate the brightness of the display in the usual way.

As explained above, data is read from the memory 17 into the buffer 31 during the line fly-back time of the T.V. During this period it is important to ensure that the memory 17 is not simultaneously accessed by the read/modify/write control unit 16. Accordingly, during line fly-back, an inhibit data input signal is supplied from the T.V. sync generator 32 to the main memory input control clock 15. The clock 15 is thus prevented from generating clock pulses during fly-back time.

It can be seen that the complete apparatus has several asynchronously operating parts. The writing of live digital video into the buffer 13 is synchronised only with radar trigger and the display range setting. The transfer of video data from the buffer 13 for modifying data in the main memory 17 is synchronised in effect with the azimuth pulses produced by the azimuth digitiser 19. (A fresh range scan, i.e. reading of data from the buffer 13 is initiated only after receipt of a new azimuth pulse when a fresh set of R Sin $\theta$ and R Cos $\theta$ data is ready). Also, the reading of data from the memory 17 is synchronised with T.V. line sync. These asynchronous operations enable each of the parts to operate at its own best rate but with the apparatus arranged to ensure there is no interference between the parts.

Data is only written into the video buffer store 13 on receipt by the video write clock 14 of an enable signal from the main memory input control clock indicating that a buffer store reading cycle is not in progress. Then a fresh set of video data is written into the buffer 13 following the next radar trigger pulses. With this arrangement several radar trigger pulses may occur during buffer reading cycles so that video data is lost. However since the preferred beam of the radar width is relatively wide, this loss of data need not be signficant. Further in a preferred arrangement, pulse-to-pulse correlation is performed on the video data stored in the buffer 13, using the data at radar trigger pulses which would otherwise be lost.

Figure 3:
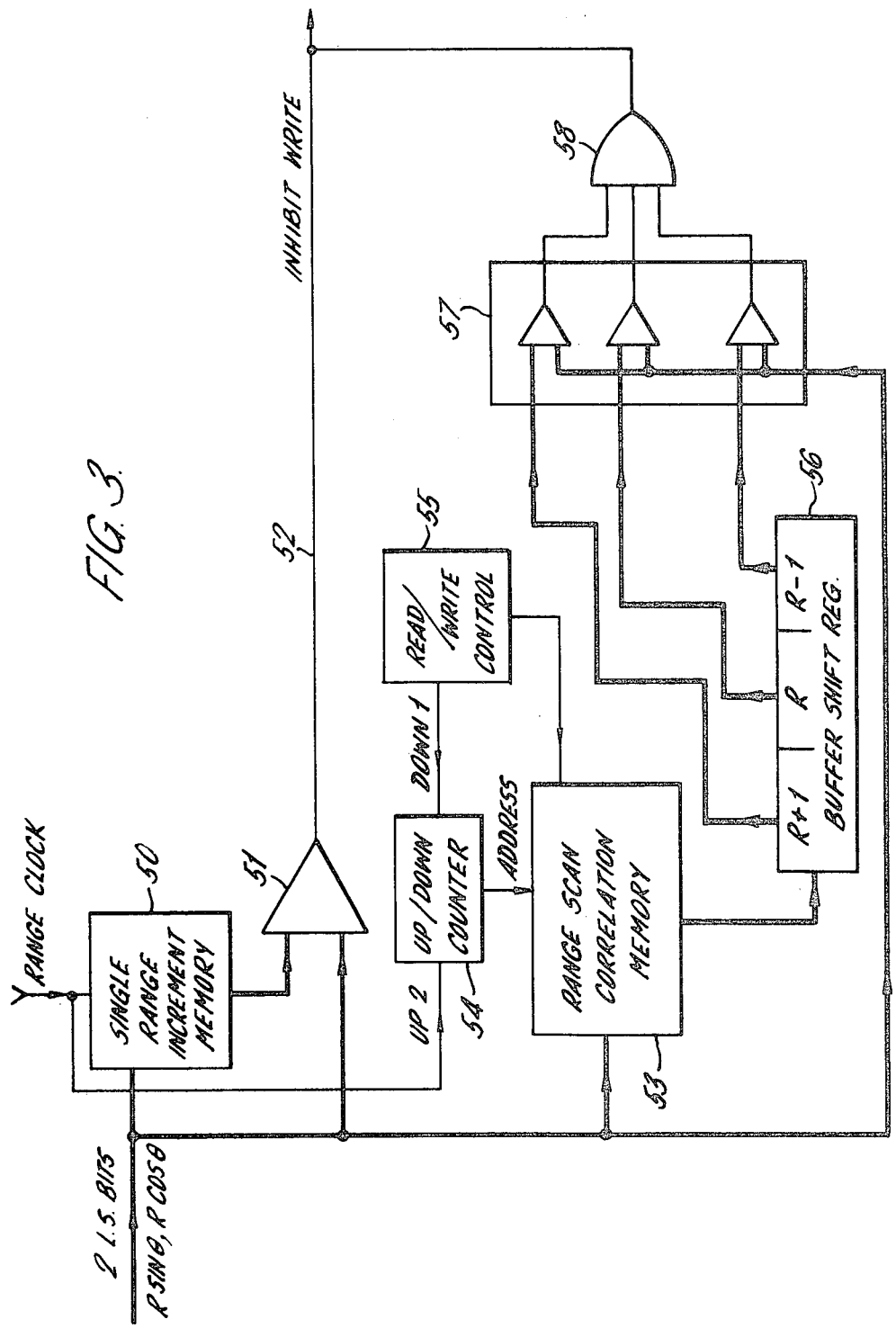
FIG. 3 is a block schematic diagram illustrating the cell correlator of FIG. 1.

Referring now to FIG. 3, the cell correlator unit 24 of FIG. 1 is shown in more detail. As explained previously, the two least significant bits of the R Sin $\theta$ and R Cos $\theta$ data provided by the accumulators 22 and 23 are supplied to the correlator and fed to a single range increment memory unit 50. The memory unit 50 is effective to store these bits, four in all, on receipt of each range clock as supplied from the main input control clock 15. On the subsequent range clock, the contents of the memory 50 is presented to a comparator 51 which compares it with the latest pair of least significant bits corresponding to the next range increment. If the comparator 51 detects that the latest set of bits correspond to those stored in the last range increment, an inhibit write signal is produced on the line 52, which prevents the read/modify/write control unit 16 from writing the modified number back into the main memory 17 as described previously. Thus, the cell correlator prevents modification of the contents of the memory 17 if two successive range increments covert to the same Cartesian co-ordinates which would identify the same cell location in the memory 17.

The least significant bits of R Sin $\theta$ and R Cos $\theta$ are also supplied in the correlator 24 to a range scan correlation memory 53. Each range clock pulse is also supplied to an up/down counter 54 and causes the counter to count up by 2 units. The count in the counter indentifies an address in the range scan correlation memory 53. A read/write control unit 55 controls the writing of data into and reading of data from the memory 53. The memory 53 has four bit locations for each range increment of a complete range scan.

Considering a particular range clock pulse identifying the Rth range increment in the relevant range scan, this clock pulse causes the counter 54, which was previously identifying an address in the memory 53 for the last range increment (R−1), to count up two units so that the counter now indicates the address R+1. The read/write control unit 55 then causes the contents of the R+1 address of the memory 53 to be read out and the four bits from this address to be stored in a buffer shift register 56. It will be appreciated that the contents of the R+1 address of the memory 53 are the two least significant bits of (R+1) Sin ($\theta - \delta\theta$) and (R+1) Cos ($\theta - \delta\theta$) i.e. the coordinates of the R+1 range increment of the preceding range scan ($\theta - \delta\theta$). Having read out the contents of the R+1 address the read/write control unit 55 sends a pulse to the counter 54 so that the counter counts down 1 unit so as now to identify the address R. The read/write control unit 55 then writes the latest two least significant bits of R Sin $\theta$ and R Cos $\theta$ into the R address of the memory 53. In response to the next range clock pulse the up/down counter 54 is counted up to R+2 and the contents of R+2 address is read from the memory 53 into the buffer shift register 56, as the previous R+1 contents of the shift register are shifted along the register. The register 56 has space for three sets of four bits. It can be seen therefore that considering again the case of the Rth range clock pulse, and following reading the contents of the address R+1 from the memory 53 into the buffer shift register 56, the buffer shift register will contain the four bits of data from each of the R+1, R and R−1 addresses before these were overwritten by new information in the present range scan. Thus, the buffer shift register 56 contains the two least significant bits of the cartesian coordinates for the range increments R−1, R and R+1 of the preceding range scan (θ−δθ). These three sets of bits are compared with the latest set of bits for R Sin θ and R Cos θ in a set of three comparators 57 and if any of the comparators indicate that the latest set of four bits is the same as one of the sets in the buffer shift register 56, an OR gate 58 produces an inhibit write signal on the line 52 to prevent modification by the control unit 16 of the data in the relevant cell location of the memory 17.

Figure 4:
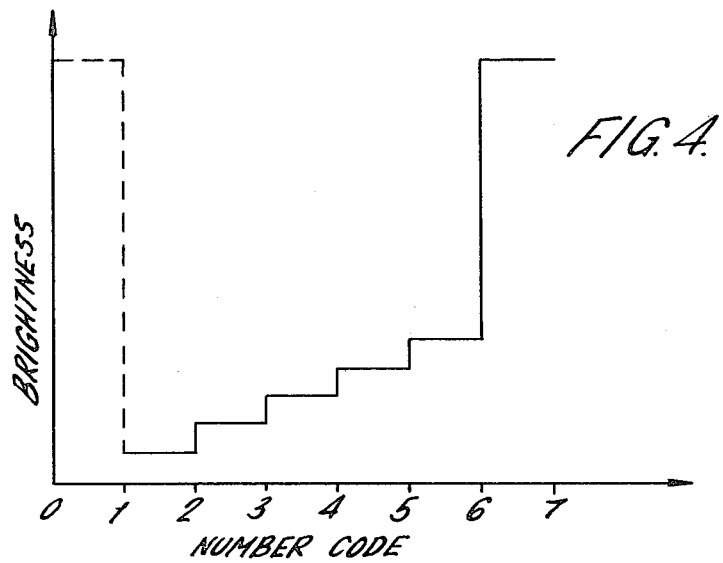
FIG. 4 is a graphical representation of the display brightness response against the numbers representing correlation levels stored in the cell locations of the main memory of FIGS. 1 and 2.

Referring again to FIG. 2, the D-to-A converter 40 provides analog video levels on the line 41 corresponding to the three-bit digital numbers previously stored in the main memory 17. It is preferable to ensure that there is a non-linear response between the values of these digital numbers and the resulting brightness of the respective cells on the T.V. display 30. FIG. 4 illustrates graphically a desirable response for the digital to analog converter 40. The eight levels which can be represented by the three-bit digital numbers stored in the memory 17 are identified by the numbers 0 to 7 along the X axis and the Y axis represents the brightness of the respective cells on the T.V. display. As shown, the levels 1 to 5 provide linearly increasing brightness on the T.V. display. However, the D to A converter 40 is arranged so that levels 6 and 7 both produce substantially maximum brightness on the display. Preferably the brightness of level 5 is less than half the brightness of levels 6 and 7. In this way, cells corresponding to highly correlating targets in the radar returns exhibit relatively high brightness on the display and therefore stand out relative to less well correlating targets.

Figure 5:
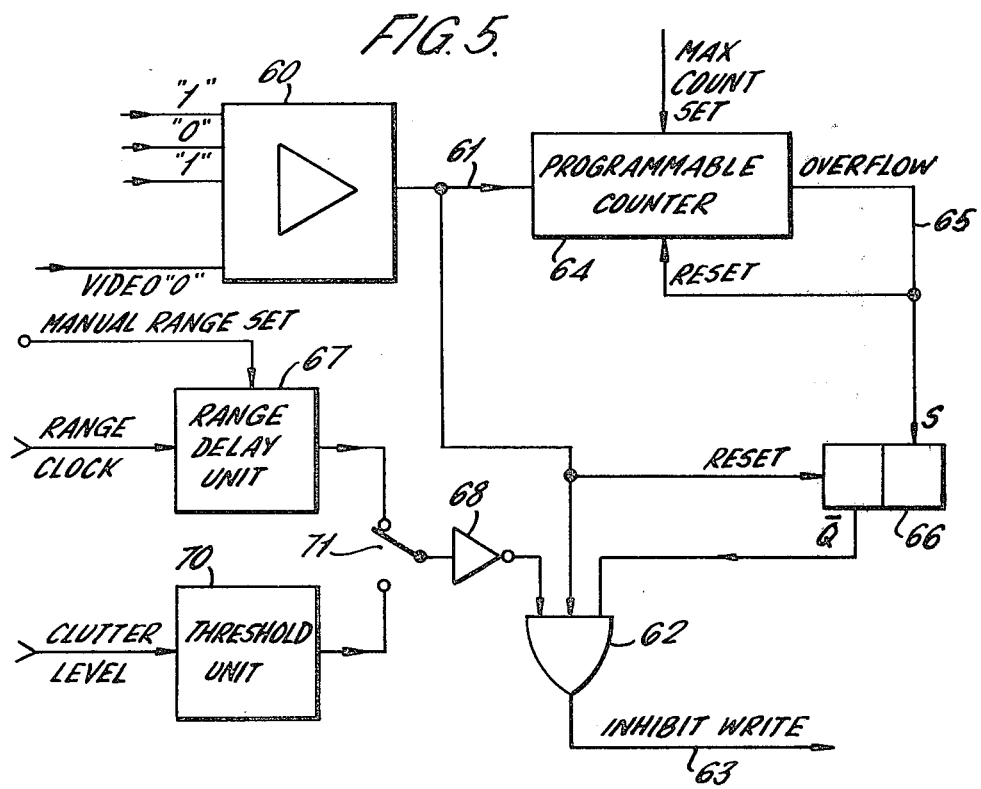
FIG. 5 is a block schematic diagram of a synthetic afterglow control arrangement incorporated in the read/modify/write control unit of FIG. 1.

Referring now to FIG. 5, there is illustrated block schematically an arrangement forming part of the read/modify/write control unit 16, for producing synthetic afterglow on the T.V. display. In simple operation of the read/modify/write control 16, whenever the digital video from the video buffer 13 is at logic 0, one is subtracted from the number read from the main memory 17 before this decremented number is written back into the memory. As a result, once a target has moved so that a previously well correlated cell no longer contains a target response, the brightness of the cell will rapidly fall off to a minimum level. However, in the arrangement of FIG. 5, the three bits of the number read from the relevant cell location of the memory 17 are supplied to a comparator 60 together with the digital video read from the buffer 13. If the comparator 60 identifies that the number read from the memory 17 indicates level 5, and also the digital video is a logic 0, the comparator produces a signal on a line 61. In response to the signal on line 61, an AND gate 62 produces an inhibit write signal on a line 63 if its other two inputs are a logic 1 as described later. The inhibit write signal on line 63 inhibits the control unit 16 from writing a decremented number back in the relevant cell location of the memory 17 so that the number in the location remains at level 5. In this way, level 5 indications are retained in the memory 17 and continue to be displayed on the display screen at the appropriate reduced brightness level, thereby producing afterglow tails for moving targets.

The signals on line 61 are also fed to increment the count in a programmable counter 64. The maximum count in the counter can be preset manually and on reaching the maximum count an overflow signal is produced on a line 65 which sets a latch 66 and simultaneously resets the counter to zero. Setting of the latch 66 effectively removes the logic 1 from one input of the AND gate 62. As a result, on receipt of the next signal on line 61, representing a further simultaneous video logic 0 and level 5 cell, the AND gate 62 blocks the signal so that the inhibit write pulse is not produced on the line 63 and the decremented number (level 4) is duly written in to the relevant cell. On receipt of this subsequent signal on line 61, the latch 66 is reset. It can be seen therefore that if the maximum count set into the counter 64 is N, one level 5 cell is allowed to escape from the afterglow control system in every N such cells. In this way the total number of afterglow-maintained level 5 cells on the display is maintained fairly constant irrespective of the number of moving targets. Therefore the afterglow tails of moving targets are shorter the greater the number of such targets. The total number of maintained afterglow cells, and hence the synthetic persistence of the display can be controlled in accordance with the maximum count set into the counter 64.

Further, the afterglow response of the apparatus can be controlled automatically in various ways. For example, the operation of the afterglow control circuit can be inhibited at short ranges. It can be advantageous to reduce or eliminate afterglow at short ranges where there may still be relatively high amounts of residual clutter. To achieve this, the range clock pulses from the main memory input clock 15 are supplied to a range counter unit 67. The range counter unit produces a pulse, in response to each initial range clock, which lasts for a predetermined number of range increments. The pulse from the range delay unit 67 is fed via an inverter 68 to one of the inputs of the AND gate 62. It can be seen that during the duration of the pulse from the unit 67, the AND gate 62 is blocked so that inhibit write signals cannot be produced on the line 63. The duration of the pulses produced by the unit 67 can be set manually out to a desired range.

Alternatively, the circuit can be arranged to prevent the production of afterglow tails automatically in response to the level of received clutter. In the example in FIG. 1, the video processor 11 produces a signal which is representative of the level of received clutter and this signal can be fed to the read/modify/write control unit 16 on the line 69. In the circuit of FIG. 5, the clutter level signal is supplied to a threshold unit 70 which produces a logic 1 so long as the clutter exceeds a preset threshold level. This logic 1 is fed via a two-way switch 71 to the inverter 68 and blocks the AND gate 62 as before. The two-way switch 71 enables the selection of either range dependent afterglow control (swept afterglow) or clutter dependent afterglow control (adaptive afterglow).

Referring again to FIG. 1, the read/modify/write control unit 16 is arranged so as never to decrement a three-bit number read from the main memory 17 below the level 1 (0 0 1). The level 0 (0 0 0) is in effect set aside for use in labelling cells as marker cells for generating markers on the T.V. display. Thus, in FIG. 1, a marker generator is arranged to superimpose the number 0 0 0 on the data lines from the read/modify/write control unit 16 to the memory 17 to write this level 0 number into the relevant cell locations of the memory 17. The marker generator 80 identifies the relevant cells in which to superimpose the level 0 to produce a marker on the display screen in the usual way. For example, for range markers, marker generator superimposes the level 0 numbers at successive predetermined counts of the pulses from the main memory input control clock 15 following the delayed trigger pulse. Alternatively, the marker generator 18 can produce a video map on the display by superimposing the level 0 numbers in response to signals from a video map apparatus driven in synchronism with the pulses from the main memory input control clock 15. Alphanumeric markers can also be written on the display employing similar techniques.

The digital to analog converter 40 is arranged to respond to the level 0 numbers or codes from the line buffer 31 to generate a video level on the line 41 corresponding to relatively high brightness for the designated marker cell. This response of the D-to-A converter 40 is illustrated by the dotted line in the graphical representation of FIG. 4.

A main advantage of employing the level 0 0 0 to identify marker cells is that this level is numerically below the level 5 employed by the afterglow control circuit. As a result, the marker brightness falls off substantially immediately on the display screen when the markers are turned off.

Throughout the foregoing description of an example of the invention, reference has been made to controlling the brightness of cells on the display 30 in accordance with the levels in the memory 17. It will be appreciated however that similar results can be obtained using a color T.V. display and controlling the color of the cell in response to the levels in the memory 17. Then display control means may be arranged to produce substantially constant luminosity for all levels except that representing minimum display response, i.e. (001) in the above example. This minimum display response is arranged still to produce low or zero luminosity on the color display. All other levels are decoded to produce a unique color on the display.

Then all targets displayed have similar visibility on the display and their degree of correlation can be determined from their color. Marker cells also can be arranged to have a single distinct color.

In another arrangement, some variation in luminosity may be provided as well as variations in color.

What is claimed is:

1. Radar display apparatus for an azimuth scanning radar comprising a radar video digitiser;
   electronic digital storage means having a storage location for each of a predetermined number of cells forming between them a T.V. type radar display picture;
   storage control means for converting the range/azimuth angle coordinates of the received digitised radar video into Cartesian coordinates for identifying the store locations of the corresponding cells in the storage means and for modifying data in the identified locations of said storage means so that the digital data in each said cell location is representative of the degree of positive correlation of digital video returns occurring in the respective cell on successive radar azimuth scans;
   T.V. type visual display means; and
   display control means arranged to read said digital data from the storage means and to control said display means to provide a substantially real time radar display picture composed of said cells with the brightness or color of each cell being representative of said degree of positive correlation,
   wherein said storage control means has locations for cells in a rectangular matrix for said T.V. display, and
   wherein the range/azimuth angle (r, θ) co-ordinates are expressed digitally with unit range increments defining a range scan at each of successive azimuth increments and said store control means includes cell correlations means arranged to identify when successive range increments of a range scan in (r, θ) co-ordinates convert to the same Cartesian co-ordinates and then to effect said modification of data in the respective cell location of the storage means only once in the range scan.

2. Radar display apparatus as claimed in claim 1 wherein said cell correlation means includes means for storing at least the two lowest order bits of the cell location identifying Cartesian co-ordinates following each said conversion from (r, θ) co-ordinates, means for comparing said stored bits with the corresponding bits of the subsequent conversion and means for inhibiting said modification of data if said stored bits and said corresponding subsequent bits are the same.

3. Radar display apparatus as claimed in claim 1 or claim 2 wherein the cell correlation means is further arranged to identify when (r, θ) co-ordinates in successive range scans convert to the same Cartesian co-ordinates and then to effect said modification of data in the respective cell location of the storage means only on one of said range scans.

4. Radar display apparatus as claimed in claim 3 wherein said cell correlation means comprises means for storing during each range scan at least the two lowest order bits of the cell location identifying Cartesian co-ordinates following said conversion of all the unit range increments, means for comparing the corresponding bits of the conversion of each range increment of the subsequent range scan with the stored bits for the corresponding and immediately adjacent range increments, and means for inhibiting said modification of data if said corresponding bits of said subsequent range scan are the same as said stored bits of any of said corresponding or immediately adjacent range increments.

5. Radar display apparatus for an azimuth scanning radar comprising a radar video digitiser;
   electronic digital storage means having a storage location for each of a predetermined number of cells forming between them a T.V. type radar display picture;
   storage control means for converting the range/azimuth angle coordinates of the received digitised radar video into Cartesian coordinates for identifying the store locations of the corresponding cells in the storage means and for modifying data in the identified locations of said storage means so that the digital data in each said cell location is representative of the degree of positive correlations of digital video returns occurring in the respective cell on successive radar azimuth scans;
   T.V. type visual display means; and
   display control means arranged to read said digital data from the storage means and to control said display means to provide a substantially real time radar display picture composed of said cells with the brightness of color of each cell being representative of said degree of positive correlation,
   wherein the radar video digitiser provides a one bit digital video signal with a logic "0" indicating no video and a logic "1" indicating a positive video return.

6. Radar display apparatus as claimed in claim 5 wherein said storage means has locations for cells in a rectangular matrix for said T.V. type display.

7. Radar display apparatus as claimed in claim 5 wherein said electronic digital storage means has three bits of storage for each said cell location, and said store control means is arranged to write into said location digital numbers representing up to eight levels of said positive correlation.

8. Radar display apparatus as claimed in claim 7 wherein said store control means is arranged so as, on each modification of data in a cell location, to read the digital number already stored in the location, to increment the number by one if the digital video indicates a positive video return and to write the thus-incremented number back into the location.

9. Radar display apparatus as claimed in claim 8 wherein the digital number is progressively decremented and written back into the location in the absence of positive video returns.

10. Radar display apparatus as claimed in claim 9 wherein the cell brightness is representative of the degree of positive correlation and wherein decrementing of the number in the location below a predetermined value is temporarily inhibited so as to generate a synthetic "afterglow" effect on the display means.

11. Radar display apparatus as claimed in claim 10 wherein the store control means has a comparison device arranged to produce a write inhibit signal, when the number read from the cell location being modified is said predetermined value and the digital video is logic "0", so as to inhibit writing of a decremented number in the location, a counter arranged to be incremented in response to each said write inhibit signal, and a latch device responsive to the counter reaching a preset maximum count to prevent inhibiting of the writing of a decremented number in the cell location being modified on the next occasion the number read is said predetermined value and the video is logic "0".

12. Radar display apparatus as claimed in claim 11 wherein the store control means has range dependent afterglow control means arranged to prevent said inhibiting of the writing of a decremented number when in response to video logic "0" returns at below a predetermined range.

13. Radar display apparatus as claimed in claim 12 wherein said predetermined range can be set manually.

14. Radar display apparatus as claimed in any one of claims 11 to 13 and in combination with radar apparatus having a video processor providing a clutter level signal responsive to the level of clutter noise in the received video, wherein the store control means has clutter level dependent afterglow control means arranged to prevent said inhibiting of the writing of a decremented number when the clutter level signal indicates the received clutter is above a predetermined clutter threshold level.

15. Radar display apparatus as claimed in claim 10 wherein said store control means is arranged to set aside one of said levels represented by digital numbers written into the cell locations, for identifying a marker cell on the visual display means, and a marker generator is provided to designate predetermined calls as marker cells and to superimpose the number representing said one level on the data being written by the store control means into said marker cells, said level which is set aside being selected to have a digital number which is below said predetermined value at which decrementing is temporarily inhibited to generate afterglow.

16. Radar display apparatus as claimed in claim 15 wherein said display control means is arranged to identify said set aside marker level and to generate a relatively high brightness level on the display for marker cells so designated.

17. Radar display apparatus as claimed in claim 15 or claim 16 wherein said store control means is arranged to generate digital numbers for writing into said cell locations representing at least four said levels of positive correlation, distinct from the set aside marker level, the four levels being a top level for highly correlated video returns for generating high brightness cells on the display means, an intermediate level for less highly correlated returns for generating less bright cells, a low level for relatively uncorrelated returns for generating low brightness cells, and a bottom level for no returns for generating substantially dark cells, said intermediate level corresponding to the predetermined value at which decrementing is temporarily inhibited to generate afterglow.

18. Radar display apparatus as claimed in claim 17 wherein said display control means is arranged to produce on the display means a non-linear response between brightness and the levels represented by the digital numbers read from said cell locations so that the higher level or levels representing highly correlated video returns are substantially brighter on the display means than the intermediate and lower levels.

19. Radar display apparatus as claimed in claim 10 but wherein the visual display means and the display control means are arranged so that the color of each cell, instead of the brightness, is representative of said degree of positive correlation, said synthetic "afterglow" effect being then a color effect rather than a brightness effect.

20. Radar display apparatus as claimed in claim 1 or 5 and including a video buffer store arranged to store in real time digitised video returns from a single range scan, said store control means being arranged to read said stored video returns from the buffer store for use in modifying data in the cell locations of said storage means.

21. Radar display apparatus as claimed in claim 20 and including a first clock arranged for writing the video returns into the buffer store in real time at a first clock rate and said store control means having a second clock arranged for reading the stored video returns from the buffer store and appropriately modifying the data in said storage means at a second clock rate.

* * * * *